United States Patent [19]

Dyer et al.

[11] 4,040,801

[45] Aug. 9, 1977

[54] METHOD AND APPARATUS FOR RAPID ADJUSTMENT OF PROCESS GAS INVENTORY IN GASEOUS DIFFUSION CASCADES

[75] Inventors: Robert H. Dyer; Andrew H. Fowler; Paul R. Vanstrum, all of Oak Ridge, Tenn.

[73] Assignee: The United States of America as represented by the United States Energy Research and Development Administration, Washington, D.C.

[21] Appl. No.: 696,149

[22] Filed: June 14, 1976

Related U.S. Application Data

[63] Continuation of Ser. No. 674,201, April 5, 1976, abandoned.

[51] Int. Cl.² .............................................. B01D 53/22
[52] U.S. Cl. .......................................... 55/16; 55/158
[58] Field of Search ................. 55/16, 17, 21, 66, 163; 137/90, 110; 210/137

[56] References Cited

U.S. PATENT DOCUMENTS

| | | | |
|---|---|---|---|
| 2,085,526 | 6/1937 | Diescher | 137/110 X |
| 3,208,197 | 9/1965 | Simon et al. | 55/16 |
| 3,435,840 | 4/1969 | Clarke | 137/110 |
| 3,792,570 | 2/1974 | Biondi et al. | 55/16 |
| 3,856,486 | 12/1974 | Chang | 137/110 X |
| 3,961,917 | 6/1976 | Benedict et al. | 55/16 |

Primary Examiner—Frank A. Spear, Jr.
Assistant Examiner—Robert H. Spitzer

Attorney, Agent, or Firm—Dean E. Carlson; Stephen D. Hamel; Fred O. Lewis

[57] ABSTRACT

This invention relates to an improved method and system for making relatively large and rapid adjustments in the process gas inventory of an electrically powered gaseous diffusion cascade in order to accommodate scheduled changes in the electrical power available for cascade operation. In the preferred form of the invention, the cascade is readied for a decrease in electrical input by simultaneously withdrawing substreams of the cascade B stream into respective process-gas-freezing and storage zones while decreasing the datum-pressure inputs to the positioning systems for the cascade control valves in proportion to the weight of process gas so removed. Consequently, the control valve positions are substantially unchanged by the reduction in invention, and there is minimal disturbance of the cascade isotopic gradient. The cascade is readied for restoration of the power cut by simultaneously evaporating the solids in the freezing zones to regenerate the process gas substreams and introducing them to the cascade A stream while increasing the aforementioned datum pressure inputs in proportion to the weight of process gas so returned. In the preferred form of the system for accomplishing these operations, heat exchangers are provided for freezing, storing, and evaporating the various substreams. Preferably, the heat exchangers are connected to use existing cascade auxilliary systems as a heat sink. A common control is employed to adjust and coordinate the necessary process gas transfers and datum pressure adjustments.

12 Claims, 5 Drawing Figures

METHOD AND APPARATUS FOR RAPID ADJUSTMENT OF PROCESS GAS INVENTORY IN GASEOUS DIFFUSION CASCADES

BACKGROUND OF THE INVENTION

This invention was made in the course of, or under, a contract with the United Stastes Energy Research and Development Administration.

This application is a continuing application of Ser. No. 674,201, filed on Apr. 5, 1976.

This invention relates generally to methods and apparatus for the operation of gaseous diffusion cascades of the kind in which the gas being processed (i.e., the "process gas") is circulated through separation stages by means of electrically powered compressors More particularly, this invention relates to an improved method and system for making relatively large changes in the process gas inventory of a cascade in a relatively short time without upsetting cascade equilibrium. As used herein the term "cascade" refers to an entire diffusion plant having a feed point, a product-withdrawal point, and a tails-withdrawal point or to a segment of such a plant. The term process gas inventory is used herein to refer to the quantity of gas being processed in a cascade or cascade segment at any given time.

The typical United States gaseous diffusion cascade for the separation or uranium isotopes comprises a large number of serially connected diffusion stages, through which gaseous uranium hexafluoride ($UF_6$) is circulated. The stages of the cascade are controlled individually or as groups; that is, an automatic control valve is provided for each stage or for each group of stages. In present cascades, each of the control valves is operated by a control system which is connected into a header containing gas at a carefully controlled reference, or datum, pressure. Each valve-control system positions its control valve to maintain the process gas pressure and inventory in its associated stage(s) at selected values. That is, the typical valve-control system compares the process gas pressure upstream of its control valve with the datum pressure; if the process gas pressure (and thus the $UF_6$ inventory) deviates from a preselected value, the system proportionally changes the position (port area) of its control valve to offset the deviation. The various valve-control systems for a cascade cell are connected into a common datum header. Thus, normally an increase or decrease in the cell datum pressure will respectively increase or decrease the stage pressures and inventory of the cell.

To reduce capital costs, the typical full-gradient diffusion cascade is designed as a succession of "square" sections, the stages in any one section being of identical size, or volume. The section composed of the largest-volume stages includes the cascade feed point for the introduction of the gaseous $UF_6$ to be processed. The cascade sections extendng in either direction from the feed section are of progressively decreasing stage size. The final stage at the "top" end of the cascade is provided with a product-withdrawal line for the removal of gas enriched in $^{235}UF_6$, and the final stage at the bottom of the cascade is provided with a tails-withdrawal line for removal of gas depleted in the same. Each stage receives an input stream of process gas and separates the same into an upflowing stream and a downflowing stream having substantially the same mass flow rates, the upflowing stream being very slightly enriched in $^{235}UF_6$ as compared with the downflowing stream. Thus, the cascade as a whole can be considered as having an upflowing stream A of enriched process gas and a downflowing stream B of depleted process gas. The upflowing stream for a stage is at an appreciably lower pressure than its associated downflowing stream. The typical cascade section consists of a plurality of serially connected cells, each of which comprises a plurality of serially connected states. Any one cell can be isolated from the remainder of the cascade by closing a pair of block valves at each end of the cell. The design and operation of gaseous diffusion stages and diffusion cascades are described in the following co-pending, co-assigned United States Patent Applications and references cited therein: Ser. No. 238,716, filed on Dec. 29, 1971; Ser. No. 329,157, filed on Feb. 2, 1973; and Ser. No. 423,364, filed on Dec. 14, 1973.

Referring to FIG. 1, the solid curve is an idealized representation of the way in which compressor horsepower, electrical power input, and process gas inventory vary with stage location in a gaseous diffusion cascade. (In an actual cascade, the line does not vary smoothly but consists of steps.) When, for some reason, an appreciable and temporary reduction in the electrical power input to the cascade is scheduled, the cascade process gas inventory, or load, must be decreased correspondingly—as, for example, to the level represented by the dashed line in FIG. 1. Previously, this has been accomplished by shutting of the feed stream to the cascade and withdrawing the $UF_6$ at the product- and tails-withdrawal points only, while readjusting the set points for certain stage control valves to lower values corresponding to the reduced process gas inventory and pressure level. the removal of the product and tails streams has been effected by condensation to the liquid. Upon restoration of the power reduction, it has been customary to restore the process gas inventory to its previous valve by re-instituting the feed stream and adjusting the stage pressure-control points to higher values.

The above-described method of adjusting cascade inventory is subject to several disadvantages. For example, the maximum rates at which the process gas inventory can be so withdrawn and returned are undesirably low. Rapid withdrawal rates are of special importance to the supplier of electrical power to the cascade. For example, a major supplier has agreed to provide up to 20% more cascade power over a six-year period if cascade inventory reductions corresponding to 200 $MW_e$ (electrical megawatts) can be accomplished within ten minutes rather than the usual hour. On the other hand, the rate at which the process gas inventory can be restored to its normal value is of special importance to the operator of the cascade, since cascade production is a direct function of power input.

The problem of making more rapid adjustments in the cascade inventory is complicated by the fact that withdrawal of process gas from a stage or cell normally causes the associated stage-control systems to re-position their respective control valves. This can result in the propagation of undesirable transient instability, particularly in the downflowing cascade stream. The more rapid the inventory adjustment, the greater the degree of upset in the cascade equilibrium. Upsets in the cascade equilibrium disturb the normal isotopic gradient in the cascade, resulting in costly losses due to the mixing of volumes of $UF_6$ having different isotopic compositions.

Preferably cascade inventory adjustments are made without stopping or starting the drive motors for the state compressors. This objective is met by a previously suggested method for making more rapid inventory adjustments—i.e., the method of pumping part of the inventory into large gas-storage drums and subsequently returning the stored gas to the cascade. Because of the large volumes of gas involved, however, that method is subject to high costs and to appreciable mixing losses.

Cylinders provided with heating and cooling means have been used in gaseous diffusion cascades to "cold-trap" relatively small amounts of $UF_6$ from the A or B stream and to subsequently vaporize the trapped $UF_6$ back into the same stream. It has not been the practice to cold-trap process gas in anticipation of cascade power reductions. Neither has it been the practice to automatically control a plurality of cold-trapping operations so that process-gas substreams derived from various stages are removed at equal rates to solidify the same weight of process gas during the same period of time. It has not been the practice to simultaneously cold-trap substreams from one of the cascade streams and subsequently regenerate the substreams for simultaneous introduction to the other of the cascade streams.

SUMMARY OF THE INVENTION

It is, therefore, an object of this invention to provide a novel method and system for adjusting the gas inventory of a diffusion cascade to accommodate increases or decreases in the electrical power input to the cascade.

It is another object to effect relatively rapid adjustments in cascade process gas inventory without generating excessive disturbances in cascade equilibrium.

It is another object to provide a system for withdrawing a portion of the gas inventory from a diffusion cascade, solidifying the withdrawn material for storage, and subsequently evaporating the stored material back into the cascade--these operations being effected with little or no disturbances of the isotopic gradient in the cascade.

It is another object to provide a system of the kind just described wherein the pumping costs associated with process gas withdrawal and return are minimal.

Other objects will be made evident hereinafter.

This invention can be summarized in method terms as follows:

In the method of operating a gaseous diffusion cascade wherein electrically driven compressors circulate a process gas through a plurality of serially connected gaseous diffusion stages to establish first and second countercurrently flowing cascade streams of process gas, one of said streams being at a relatively low pressure and enriched in a component of said process gas and the other being at a higher pressure and depleted in the same, and wherein automatic control systems position process gas flow control valves to maintain the stage process gas pressures at values which are functions of reference-signal inputs to said systems, the improved method of altering the cascade process gas inventory comprising: simultaneously directing into separate process-gas-freezing zones a plurality of substreams derived from one of said first and second streams at different points along the lengths thereof to solidify approximately equal weights of process gas in said zones while reducing said reference-signal inputs to maintain the positions of said control valves substantially unchanged despite the removal of process gas inventory via said substreams.

DESCRIPTION OF THE PREFERRED EMBODIMENT

This invention is directed to making large and relatively rapid adjustments in the inventory of a gaseous diffusion cascade without engendering intolerable disturbances in the process gas flow therein. The invention is generally applicable to diffusion cascades in which the process gas is derived by vaporization of a solid. The process gas may, for example, be $UF_6$ or $WF_6$. For brevity, the invention will be illustrated as employed in a conventional $UF_6$ cascade.

Figure 1:
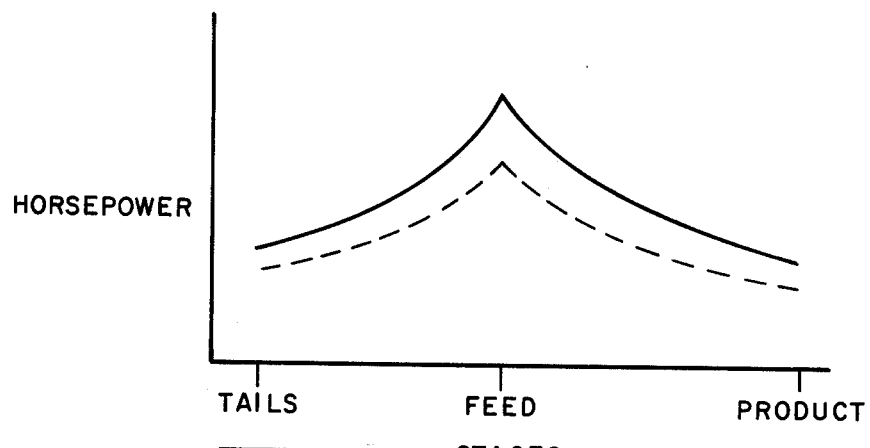
FIG. 1 is a schematic diagram illustrating the relationship of stage input horsepower and stage location in an ideal gaseous diffusion cascade.
Figure 2:
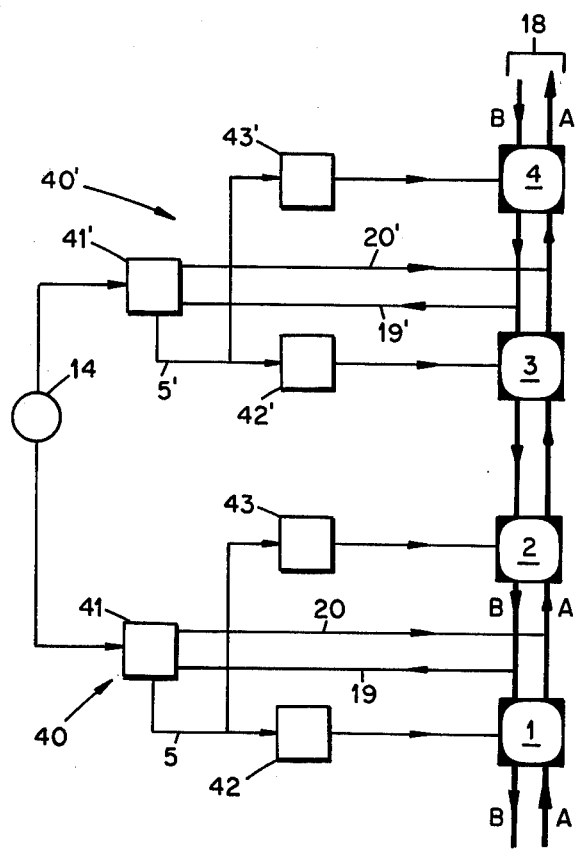
FIG. 2 is a highly schematic diagram of an arrangement designed in accordance with this invention as connected to adjust the process gas inventory of a four-cell segment 18 of a conventional diffusion cascade (shown in heavy lines)

Referring to FIG. 2, the invention is illustrated in highly schematic fashion as applied to making adjustments in the process gas inventory of a segment 18 of a conventional $UF_6$ cascade. The segment 18 consits of similar cells 1-4, each comprisng eight serially connected stages of the well-known Badger type. In accordance with this invention, a master control 14 simultaneously operates at least two similar systems 40 and 40' to (a) withdraw a portion of the $UF_6$ inventory from cells 1-4 while simultaneously reducing the datum pressures in the stages of the cells in proportion to the weight of the $UF_6$ withdrawn; (b) solidify the withdrawn $UF_6$ in freezing zones; and (c) subsequently evaporate the solidified $UF_6$ back into the cells while increasing the stage datum pressures in proportion to the weight of $UF_6$ returned. As a result of this new mode of cascade operation, the positions of the stage control valves change relatively little despite the changes in inventory; thus, cascade disturbances are eliminated or minimized.

Still referring to FIG. 2, the system 40 effects the desired inventory and datum pressure adjustments for cells 1 and 2, whereas the similar system 40' effects these adjustments for cells 3 and 4. The following is a brief description of the functions of these systems as illustrated by system 40. As shown, system 40 includes a $UF_6$-storage system 41. This is connected, through a line 19, to the higher-pressure process gas stream (the B stream) at a point between cells 1 and 2 to receive a portion of the B-stream flow. As will be described in more detail, the system 41 includes both a heat exchanger for freezing the $UF_6$ as it is withdrawn and a load cell for generating a signal proportional to the weight of the $UF_6$ in the exchanger. Throughout the period of $UF_6$ withdrawal, this signal is fed to two datum pressure control systems 42 and 43, which progressively reduce the datum pressures in their respective cells 1 and 2 in proportion to the reduction in inventory and cell pressure resulting from withdrawal from the cascade of the $UF_6$ now stored in the heat exchanger. As a result, the stage control valves in cells 1 and 2 remain at approximately their original positions despite the withdrawal of inventory, since the two inputs to the control system for each valve decreases in step correspondingly. These two inputs (see "Background", above) are the process gas pressure just upstream of the control valve and the datum pressure.

Figure 3:
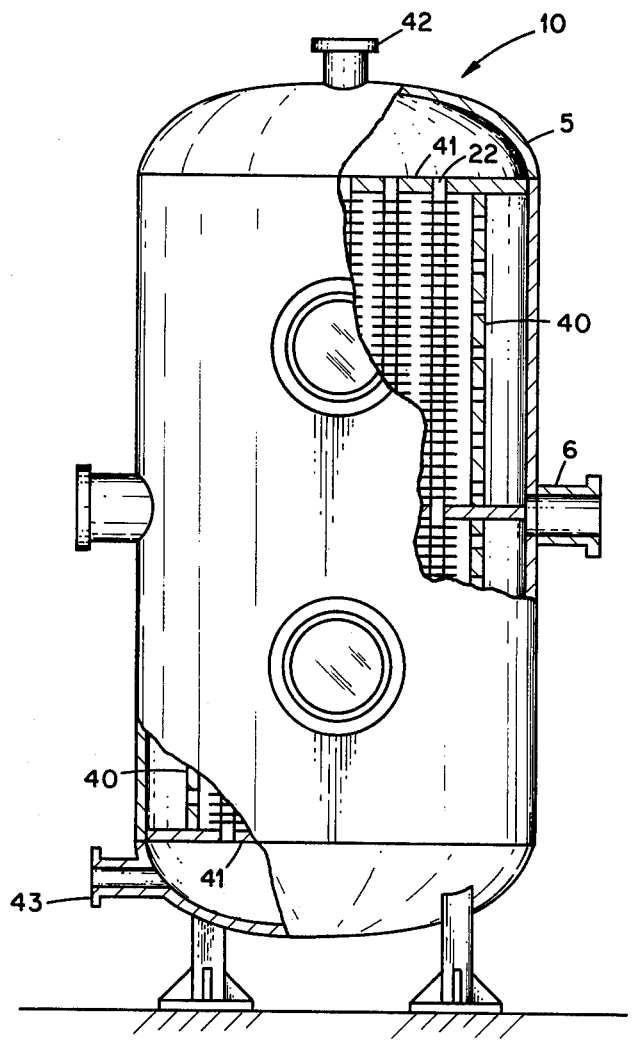
FIG. 3 is a perspective view, partly in cutaway, of a heat exchanger for selectively freezing, storing, and evaporating $UF_6$.

After $UF_6$ has been withdrawn and stored as just described, the master controller 14 can be activated to command system 40 to vaporize the stored $UF_6$ into a return line 20 connected into the low-pressure process gas stream (the A stream) at a point between cells 1 and 2. Now the decreasing weight signal from the load cell is utilized to increase the datum pressure in cells 1 and 2 in proportion to the weight of $UF_6$ returned. Consequently, the positions of the stage control valves in these cells are substantially unaffected by the addition of inventory, thus minimizing cascade disturbances. Master control 14 operates system 40' simultaneously to effect similar inventory and datum pressure changes in cells 3 and 4. In this particular form of the invention, additional pumps are not required for the transfer of $UF_6$ into and out of the systems 41 and 41', since the $UF_6$ flows readily from the relatively high-pressure B stream into the freezing zones and since the evaporated $UF_6$ is returned to the lower-pressure A stream under the impetus of its own vapor pressure The master controller 14 and the systems 40, 40' may consist throughout of conventional components. For instance, the heat exchanger drums (freezer/evaporators) in the storage systems 41, 41' may be of the kind designated as 10 in FIG. 3. As shown in that figure, the typical freezer-evaporator can comprise a vertical cylindrical shell 5 which is divided into compartments by laterally extending tube sheets 41. A bundle of tubes 22 provided with horizontally extending external fins is mounted in the tube sheets, one end of the bundle communicating with an inlet 42 for a heating/cooling fluid and the other end communicating with an outlet 43 for the same. The region surrounding the tubes is in communication with a $UF_6$ inlet/outlet 6. Perforated flow-distributing plates 40 are mounted between port 6 and the various compartments. Preferably, the top tube sheet is of the conventional free-floating type, so that it moves axially with expansion and contraction of the tubes. The entire assembly is made of materials compatible with $UF_6$. For instance, the tubes 42 can be composed of cupro-nickel and the fins of aluminum. The freezer/evaporator is designed with the $UF_6$ storage capacity and a maximum $UF_6$ freeze-out rate consistent with the desired electrical load reduction in cells 1 and 2 with operating conditions in these cells. As indicated in FIG. 4, the exchanger 10 is provided with a line 74 for venting non-condensible gases (e.g., nitrogen) to any suitable receiver, such as the cascade process gas stream A.

Figure 4:
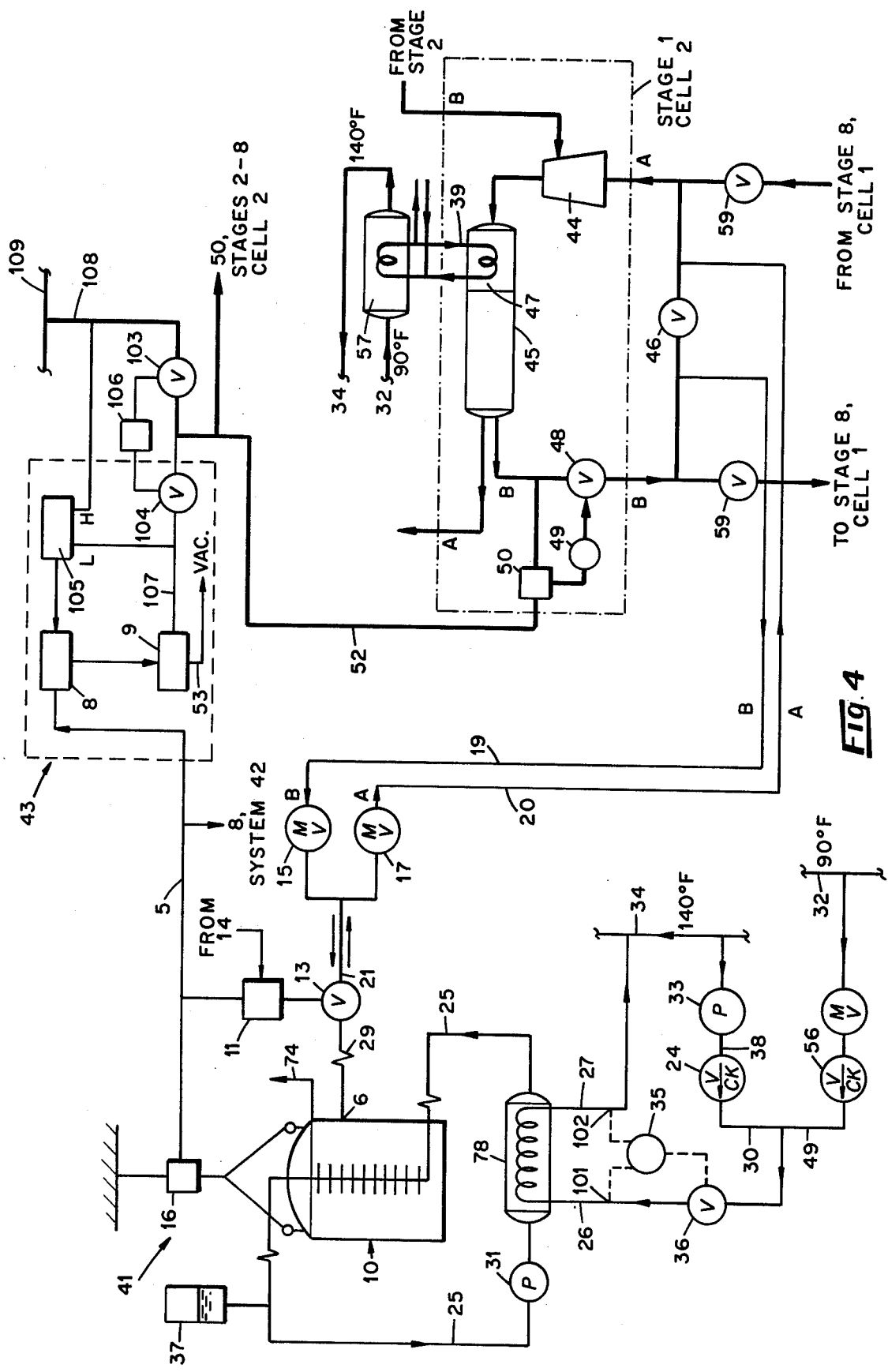
FIG. 4 is a more detailed schematic diagram of two control systems designated as 41 and 43 in FIG. 2; the systems are shown as connected to part of a conventional cascade cell (shown in heavy lines)

FIG. 4 is a more detailed diagram of both system 41 (similar to 41' of FIG. 2) and system 43 (similar to systems 42, 42', and 43' of FIG. 2.) As shown, the $UF_6$ storage and transfer system 41 includes a weight controller 11 which is connected to receive a set-point signal generated by the master control 14. The system also is connected, by means of $UF_6$-transfer lines 19 and 20, across a normally closed recycle valve 46. This valve is part of the typical cascade cell 2 and is connected between the A and B lines at the bottom of the cell. As shown, the lowermost Badger stage in cell 2 (i.e., stage 1 of the cell) includes a double-suction compressor 44 which combines the low-pressure A stream from the top stage of cell 1 (not shown) with the higher-pressure B stream from stage 2 of cell 2. The compressor discharges the resulting high-pressure mixture through a conventional diffuser 45 containing a bundle of gaseous diffusion barrier tubes. The outflow from the diffuser includes a relatively low-pressure enriched A stream. This stream is directed to the end inlet of the compressor for stage2. The diffuser outflow also includes a higher-pressure depleted B stream, which is directed to the side inlet of the compressor in the top stage (stage 8) of cell 1.

The coolant for the process-gas cooler 47 in stage 1 typically is an evaporative fluorocarbon which circulates through a natural-circulation loop 39. The heat transferred to the coolant from the process gas is in turn transferred to recirculating water in a heat exchanger 57, which is common to the gas coolers in all of the stages of cell 2. In the particular system illustrated, the inlet water to heat exchanger 57 (see line 32) is at relatively high pressure and a temperature of 90° F, whereas the outlet water (line 34) is at a lower pressure and a temperature of 140° F.

The B-stream line from typical stage 1 includes the usual control valve 48 for regulating the stage process gas pressure and inventory. The valve is connected to respond proportionally to B-stream pressure deviations from a selected value. That is, the valve positioner is responsive to a pneumatic signal from a pressure controller 49, which in turn is responsive to a pneumatic signal from a differential pressure transmitter 50. The transmitter is connected to sense the B-stream pressure just above the control valve and to compare it with a higher-value datum pressure in a header 52. The header 52 provides the datum pressure for all of the stages in cell 2. Header 52 customarily communicates (via block valve 103) with a header 109, which supplies a preselected datum pessure for a block of cells—say, cells 1 through 10. A solenoid valve 106 can be energized to close valve 103 and open another block valve 104 so as to connect the header 52 into a cell datum line 107.

In accordance with this invention, the cell datum pressure line 107 is under the control of a vacuum pressure regulator 9. This regulator is connected to receive the output from a differential datum controller 8. Controller 8 in turn is connected to receive both the "weight signal" from the aforementioned load cell 16 and the output from a differential datum transmitter 105. As shown, the inputs to transmitter 105 are connected respectively to the datum lines 107 and 108. These various instruments constitute the datum pressure control system 43, which is calibrated to respond to, say, an increasing weight signal from the transmitter 16 by reducing the pressure in cell datum lines 107 and 52 in proportion to the decrease in gas inventory represented by the weight of $UF_6$ stored in the freezer-/evaporator, or drum, 10. The proportional factor is determined by the range of differential datum transmitter 105, which is pre-set to match the weight of process gas in drum 10 to the corresponding process gas pressure in the cells 1 and 2. That is, since the distribution of pressure and temperature for an operating cell remains nearly constant over a large change in pressure level, the universal gas law (PV = MRT) applies, and it follows that the ratio of pressure to mass is P/M = RT/V, which is a constant for a given cell design and a given operating temperature.

Still referring to FIG. 4, the aforementioned $UF_6$-transfer lines 19 and 20 are connected through motor-operated block valves 15 and 17, respectively, to a line 21. This line, which contains an air-operated control valve 13, is connected through a flexible connection 29 to the $UF_6$ port 6 of the freezer/evaporator 10. A pump 31 and a loop 25 are provided for circulating any suitable heating/cooling fluid—e.g., a liquid fluorocarbon—through the tube bundle in drum 10 and then through the shell of a heat exchanger 78. As shown, the loop 25 includes an expansion chamber 37 which is connected into the outlet line from the drum. The tubing in heat exchanger 78 is connected through an inlet line 26 to receive water from either line 32 or line 34 of the aforementioned recirculating water system (depending on the setting of a switch 66, FIG. 5) and to return water to line 34 via a line 27. As shown, inlet line 26 is connected, through an air-operated control valve 36, to cold-water line 32 via a line 49. The inlet end of line 26 also is connected to hot-water line 34 via a line 30 incorporating a check valve 24 and a water pump 33. Referring again to inlet line 26 for the heat exchanger 78, the flow-control valve 36 is positioned by a differential-temperature controller 35 whose input lines are connected to thermocouples 101 and 102 provided in lines 26 and 27, respectively. The controller 35 acts to maintain a selected differential in the temperatures of lines 26 and 27 during the freezing cycle and the evaporating cycle.

Figure 5:
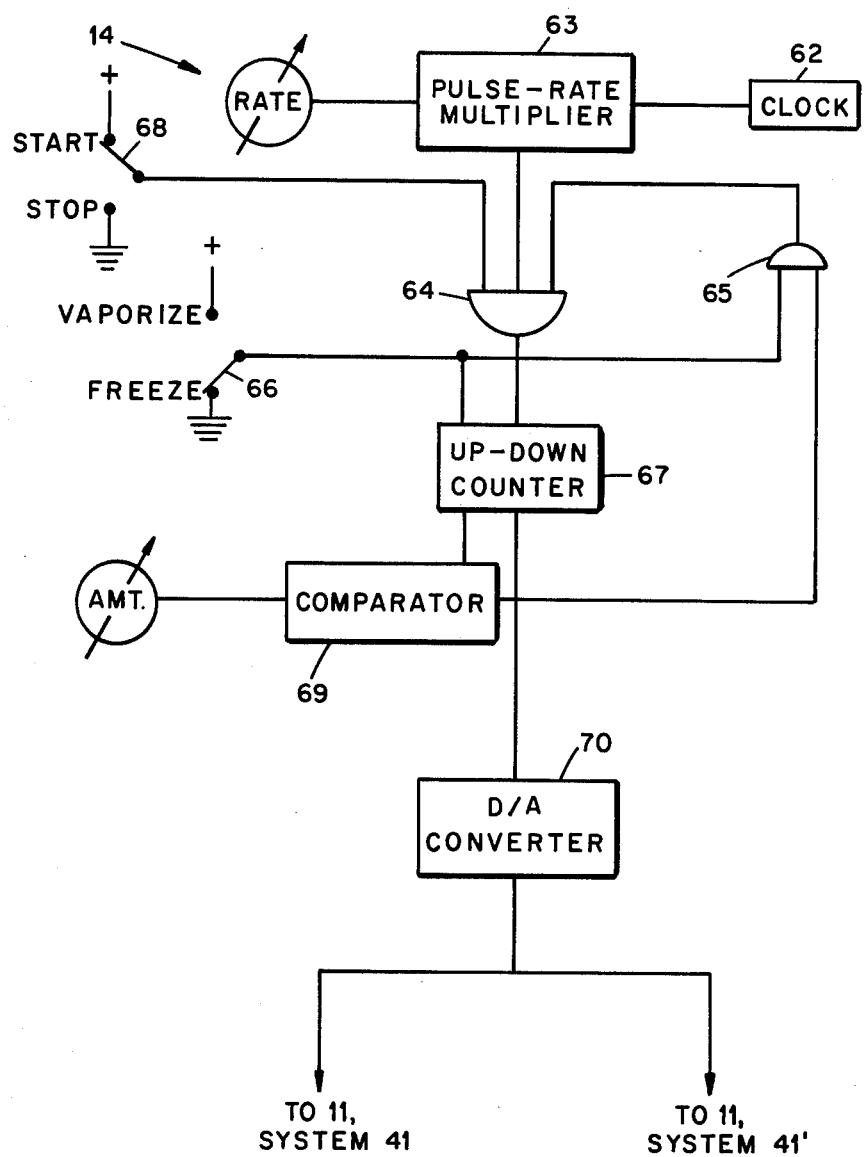
FIG. 5 is a block diagram of a master controller designated as 14 in FIG. 2.

Referring to FIG. 5, the master control 14 provides a common set-point signal to the weight controller 11 in system 41 and the corresponding controller in system 41'. The control 14 adjusts the control valve 13 so as to control the $UF_6$ transfer rate as well as the total amount of $UF_6$ transferred. These parameters preferably are maintained at substantialLy the same values for systems 41 and 41', so that these systems effect similar changes in inventory in their respective cells, thereby minimizing mixing losses. This is especially important where several systems analogous to 41 are to be operated in synchronism to adjust the inventory throughout a cascade segment consisting of many cells.

The master control 14 may consist throughout of commercially available components. In the embodiment shown in FIG. 5, it includes a switch 66 having VAPORIZE and FREEZE positions and a switch 68 having START and STOP positions, these switches being connected in circuit with a suitable voltage supply (not shown). The control 14 includes a clock-generator 62 for feeding a constant-frequency pulse train to a pulse-train multiplier 63. The pulse rate out of the multiplier 63 is proportional to the setting of a manual pulse-rate adjustment (RATE adjustment). As shown, the control circuit also includes a pair of AND gates 64 and 65; inverters 82, 84, and 86; a binary coded decimal up-down counter 67; a digital-to-analog converter 70; and a digital comparator 69 having manually set means ("AMOUNT") for adjustng a binary coded decimal therein. Assuming that switches 66 and 68 are positioned as shown to initiate a $UF_6$-freezing operation, the appropriate set-point signal is generated by control 14 as follows. The output of the pulse-rate multiplier 63 is fed into gate 64. So long as switch 68 is in START and the count in counter 67 is less than the AMOUNT setting for the comparator 69, the pulses from multiplier 63 are fed through gate 64 and counted. The accumulated count is converted by the D/A converter 70 into a set-point signal which is impressed on the weight controllers 11 in systems 41 and 41'.

Referring to the operation of the master controller (FIG. 5) in more detail, the signal fed to the gate 64 by switch 68 is high when the switch is in START position and low when it is in STOP position. As will be described, this switch is ganged to provide control of aforementioned components 15, 17, 33, 56, and 11 (FIG. 4) by means of standard relay circuitry (not shown). As indicated, switch 68 is ganged to control certain components by means of standard relay circuits. The signal fed to the counter 67 by the switch 66 is "count down" when the switch is in VAPORIZE position and "count up" when it is in the FREEZE position. The comparator 69 is connected to the output of counter 67 and compares the output with its AMOUNT setting. If the counter output differs from the comparator AMOUNT setting, one of the comparator output leads 87 and 89 is high and the other is low. These outputs are inverted by the inverters 82 and 84 and applied to the AND gate 65, whose output as a result is low but after inversion by inverter 86 is high. Consequently, the gate 64 to the counter is enabled. In other words, whenever the input to the comparator does not equal the AMOUNT setting, counts are being stored in the counter which impresses an increasing or decreasing output signal on the D/A converter 70. The converter in turn supplies a similarly changing set-point signal to the weight controllers 11 in systems 41 and 41'. The only time that gate 64 is disabled and no set-point signal is generated is when the input to the comparator becomes equal to the pre-set AMOUNT—i.e., when the desired FREEZE operation or VAPORIZE operation has been completed. In the particular embodiment illustrated in FIG. 5, the operator then throws the switch 68 to STOP before making whatever adjustments are desired for the next operation of the system. For instance, following a FREEZE operation he throws switch 68 to STOP, sets switch 66 to VAPORIZE, sets AMOUNT to zero, and, when desired, initiates a VAPORIZE cycle by returning switch 68 to START. It will be apparent to those versed in the art that, if desired, the control circuitry can be made more fully automatic. Further details on the operation are presented below.

The following is a normal sequence of operations for the overall system shown in FIG. 2. The sequence can best be followed by reference to the typical $UF_6$-storage and datum-pressure control systems shown in FIG. 4.

I. Initial Status
   A. Power Level Normal (Drums 10 Empty)
      1. Selector switch 66 on master control 14 is set to FREEZE position in anticipation of a request to decrease electrical power level.
      2. In the FREEZE position, switch 68 opens block valves 56 (line 49), admitting cooling water to control valves 36, and turns off pumps 33; thus, there is is no flow of hot water in lines 38.
      3. The temperature-differential controls 35 are pre-set to keep a 10° F difference between inlet lines 26 and outlet lines 27. Accordingly, the flow through control valves 36 maintains the temperature in loop 25 at about 10° F above the cooling water—i.e., temperature sensors 101 and 102 will see a 10° F differential. This is also true in the evaporation cycle, except that the differential will reverse.

4. The output signal from master control 14 is at its minimum (approximately 1% of scale); it is the setpoint signal for all weight controllers 11. Since drums 10 are empty, the weight transmitters 16 are supplying zero input signals to weight control 11. The FREEZE position of master controllers 14 sets the action of weight controllers 11 to "close valve 13 on increasing weight;" thus, the integrating actions of these weight controllers will put control valves 13 in their wide-open positions. (Drum 10 now is cool, and its $UF_6$ inlet/outlet valve 13 is open. The system is ready when needed.).

5. The FREEZE position of master controller 14 puts block valves 15 (B-line 19) in closed position and block valves 17 (A-line 10) in open position.

6. Thus, drums 10 are connected through open valves to the A-line 20 and are empty.

B. The operator has previously connected each cell to the "unit datum"; thus:
  1. Solenoid 106 is de-energized.
  2. Unit datum block valve 103 is open.
  3. Cell datum block valve 104 is closed.
  4. Set-point signals from weight transmitters 16 to Differential Datum Controllers 8 are at zero and these controllers manipulate vacuum pressure regulator 9 to produce zero output for Differential Datum Transmitters 105. Thus, "cell" datum line 107 is at the same pressure at "Unit" datum line 108.

II. Request to Decrease Power Level Received
  A. Operator Action
    1. Operator manually sets desired RATE of decrease on master controller 14.
    2. Operator manually sets desired AMOUNT of power decrease on Master Controller 14.
    3. Operator presses START button on master controller 14.
  B. System Response
    1. Block valves 17 close (A-line 20)
    2. Block valves 15 open (B-line 19)
    3. Process gas flows from the cascade B stream into storage drums 10 and is frozen therein.
    4. Increasing weight signal from weight transmitters 16 to setpoint of Differential Datum Controllers 8 causes cell datum pressure (lines 107 and lines 52) to decrease in proportion. Proportional factor is determined by the range of Differential Datum Transmitters 105. (Transmitters calibrated to match the known relationship of the weight of process gas to process pressure for each cell size, there being a direct relationship between pressure and inventory).
    5. Decreasing daum pressures act through stage pressure transmittes 50, controllers 49, and stage control valves 48, to stabilize B-stream pressures at values representing a decrease of cell inventory equal to the inventory frozen out in tanks 10. The control valves 48 should not move, since there is a smooth reduction in datum directly proportional to the reduction in inventory.
    6. Differential Temperature Controls 35 act to increase coling water flows in proportion to cooling loads created by freezing rates in drums 10.
    7. Response continues until either:
      a. Operator presses STOP button on master controller 14, or
      b. Accumulator on the "rate" signal of the master controller 14 reaches the "amount" set in step IIA 2.
    8. Power level and process pressure hold stable at the reduced values.

III. Permission Received to Increase Power Level
  A. Operator Action
    1. Operator sets desired RATE on master controller 14.
    3. Operator presses START button.
  B. System Response
    1. The VAPORIZE position on master controllter 14 causes:
      A. Block valves 15 (B-line 19) to close.
      B. A-line block valves 17 (A-line 20) to open.
      C. Action of weight controllers 11 to change to "open valve on increasing weight."
      D. Block valves 56 (line 49) to close.
      E. Pumps 33 (line 38) start, thus supplying hot water to the control valves 36.
    2. "Decrease" output signal from master controller 14 starts decreasing, thus:
      A. Decreasing setpoints on weight controllers 11.
      B. Opening $UF_6$-control valves 13 (line 21).
      C. Vaporized $UF_6$ flows from storage drums 10 into line 20 and thence into the cascade A-stream.
    3. Response continues until drums 10 are empty.
    4. Power level and pressure level hold stable at restored values.

It willbe understood that the arrangement shown in FIGS. 2 and 4 is illustrative only and that various modifications in the components and the mode of $UF_6$ transfer are within the scope of the invention. For example, in the arrangement illustrated in FIG. 2 one freezer/evaporator system (e.g., 40) is provided for each two cells. If desired, however, one such system could be used for each cell or for several cells. However, the larger the number of diffusion stages served by a single unit 10, the larger the mixing losses incurred by combining $UF_6$ inventories of somewhat different concentration. Thus, in most instances it is preferably for each freezer/evaporator to receive inventory from only a few cells. For a given cascade, it is preferably to make the inventory adjustments in the cascade segments composed of the largest-capacity stages.

An important advantage of operation in accordance with this invention is that changes in inventory can be accomplished at relatively high rates without unduly upsetting the cascade isotopic gradient, since the datum pressures in the affected stages are varied automatically in proportion to the amount of $UF_6$ transferred (i.e., withdrawn or returned). It has been determined that a single freezer/evaporator of the kind shown in FIG. 4 can effect $UF_6$ inventory adjustments corresponding to cascade load changes of at least 13 $MW_e$ in an existing production cascade. The unit referred to is designed for a capacity of 7000 pounds of solidifed $UF_6$.

Another important advantage of the invention is that it utilizes the existing cascade recirculating-water system as a heat sink to effect freezing and a heat source to effect evaporation. (The typical cascade recirculating-water system dumps its heat load to atmosphere.) If desired, the recirculating water itself may be used as the cooling and heating medium for the unit 10. Depending on the assay of the $UF_6$, it may be advisable to incorporate a neutron poison, such as a soluble boron compound, in the recirculating water. Alternatively, unit 10 can be a conventional double-tube-sheet heat exchanger utilizing duplex tubes for conveying the water.

A third important advantage of the invention as illustrated is that $UF_6$ transfer to and from the cascade is effected at minimum cost by withdrawing $UF_6$ from the relativey high-pressure B stream and evaporating the stored $UF_6$ back into the relatively low-pressure A stream. This eliminates the relatively large capital and operating costs associated with $UF_6$-transfer pumps and shaft seals therefor. While good results are obtained by connecting the $UF_6$-transfer lines for a given device freezer/evaporator to either side of the recycle valve 46 (FIG. 2), these lines can be respectively connected into the cascade A and B streams at other points where the streams have approximately the same isotopic composition. The lines may, for example, be connected to the A and B piping connecting stages 4 and 5 of a cell. Again, one of the lines can be connected to the B stream at a point between a pair of states in, say, cell 1, and the other to the A stream at a point between a pair of stages in, say, cell 4—assuming that the datum pressures for these cells are controlled as described and that the resulting mixing losses are considered tolerable. Although not preferred, the $UF_6$ to be frozen can be withdrawn from the A stream and returned to the B stream; this would require a refrigeraton system, however The mode of operation described herein is not limited to use of a control master controller of the kind described. That is, given the teaching herein it is well within the skill of one versed in the art to employ other set-point controllers to accomplish the purposes of the invention.

As described, this invention effects relatively large and rapid changes in cascade inventory without incurring significant disturbances in the isotopic gradient. In the form illustrated above, the invention accomplishes this by withdrawing or returning process gas at selected rates while respectively decreasing or increasing a reference (datum) pressure input to the positioning systems for the stage control valves so that the control valve positions are substantially unchanged. It will be apparent to those versed in the art that the invention is not limited to cascades where the positioning system for the stage control valve has a datum pressure as an input. For instance, in some cascade designs the port area of stage control valve is proportional to the difference between a reference voltage and a signal voltage proportional to the electrical power input to the motor driving the $UF_6$ compressor for the stage. As applied to that arrangement, the invention would comprise withdrawing and returning the process gas as described while respectively decreasing and increasing the reference voltage so that the stage control valve positions are substantially unchanged. As used herein, the term "reference-signal input" includes a datum pressure, a reference voltage, or equivalents thereof.

It will also be apparent that whereas the invention has been illustrated as applied to a cascade where each stage includes a process gas control valve, it is equally applicable to arrangements (such as the well-known Badger cluster) where a single control valve is provided for a plurality of stages. As used herein with respect to controlling stage pressures, the term "control valve" includes any suitable pressure-control device

What is claimed is:

1. In the operation of a gaseous diffusion cascade wherein electrically driven compressors circulate a process gas through a plurality of serially connected gaseous diffusion stages to establish first and second countercurrently flowing cascade streams of process gas, one of said streams being at a relatively low pressure and enriched in a component of said process gas and the other being at a higher pressure and depleted in the same, and wherein automatic control systems position process gas flow control valves to maintain the stage process gas pressures at values which are functions of reference-signal inputs to said systems, the improved method of altering the cascade process gas inventory while said cascade is operating comprising:
    simultaneously directing into separate process-gas freezing zones a plurality of substreams derived from one of said first and second streams at different points along the lengths thereof to solidify approximately equal weights of process gas in said zones while reducing said reference-signal inputs to maintain the positions of said control valves substantially unchanged despite the removal of process gas inventory via said substreams, and subsequently 2. The method of claim 1 wherein the mass flow rates of the substreams directed into said zones are maintained at substantially equal values 3. The method of claim 1 wherein each of said reference-signal inputs is varied in direct proportion to the weight of process gas solidified in one of said zones 4. In the operation of a gaseous diffusion cascade wherein electrically driven compressors circulate a process gas through a plurality of serially connected gaseous diffusion stages to establish first and second countercurrently flowing cascade streams of process gas, one of said streams being at a relatively low pressure and enriched in a component of said process gas and the other being at a higher pressure and depleted in the same, and wherein automatic control systems position process gas flow control valves to maintain the stage process gas pressures at values which are functions of reference-signal inputs to said systems, the improved method of altering the cascade process gas inventory while said cascade is operating comprising:
    simultaneously directing into separate process-gas freezing zones a plurality of substreams derived from one of said first and second streams at different points along the lengths thereof to solidify approximately equal weights of process gas in said zones while reducing said reference-signal inputs to maintain the positions of said control valves substantially unchanged despite the removal of process gas inventory via said substreams, and subsequently regenerating separate substreams of said process gas by evaporating the solids in said zones and introducing the regenerated substreams to the other of said streams at different points along the length thereof while increasing said reference-signal inputs to maintain the position of said control valves substantially unchanged despite the addition of process gas via the regenerated substreams.

5. The method of claim 4 wherein the substreams directed into said zones are derived from said higher-pressure stream anr wherein said regenerated substreams are introduced to said lower-pressure stream.

6. A system for effecting alterations in the process gas inventory of an operating gaseous diffusion cascade employing electrically driven compressors to circulate a process gas through a plurality of serially connected gaseous diffusion stages to establish first and second countercurrently flowing cascade streams of process gas, one of said streams beiig at a relatively low pressure and enriched in a component of said gas and the other being at a higher pressure and depleted in the same, said cascade including automatic control systems for positioning process gas flow control valves to maintain the stage process gas pressures at values which are functions of reference-signal inputs to said systems, said system comprising:

means for establishing a plurality of process-gas freezing zones, means for simultaneously and respectively directing into said zones substreams derived from one of said first and second streams at different points along the length thereof and freezing substantially equal weights of process gas in said zones and means for concurrently reducing said reference-signal inputs to maintain the positions of said control valves substantially unchanged despite the removal of process gas inventory via said substreams.

7. The system of claim 6 wherein said means for establishing said zones comprises a plurality of heat exchangers, each provided with means for generating a weight-signal proportional to the weight of process gas solidified therein.

8. The system of claim 7 wherein said heat exchangers are respectively provided with flow controllers for adjusting the flow rate of the substream directed thereto, each of said flow controllers having a first input for receiving the weight signal for its respective heat exchanger 9. The system of claim 7 wherein said flow controllers are connected to an electronic controller to receive a common set-point signal therefrom.

10. The system of claim 7 including means for feeding the weight signals for said heat exchangers to said means for reducing said reference-signal inputs 11. In the operation of a gaseous diffusion cascade wherein electrically driven compressors circulate a process gas through serially connected diffusion stages to establish first and second countercurrently flowing cascade streams of process gas, one of said streams being at a relatively low pressure and the other at a higher pressure and wherein the process gas pressures in said stages are maintained at selected values by control valves which are respectively operated by positioning systems, each of said systems being proportionally responsive to the difference between a first signal input and a reference-signal input thereto, the improved method of decreasing the cascade process gas inventory while said cascade is operating comprising:

simultaneously directing into separate process-gas freezing zones substreams derived from said higher-pressure stream at different points along the length of said cascade to solidify in said zones substantially equal weights of process gas while reducing the reference-signal inputs to said systems to maintain said difference at a substantially constant value despite the removal of process gas inventory via said substreams.

12. In the operation of a gaseous diffusion cascade wherein electrically powered compressors circulate a process gas through serially connected diffusion stages to establish first and second countercurrently flowing cascade streams of process gas having approximately equal mass flow rates, and wherein the process gas pressures in said stages are maintained at selected values by control valves which are respectively operated by automatic positioning systems, said systems being respectively responsive to signal inputs thereto, the method of uniformly reducing the cascade process gas inventory from a value equivalent to a first cascade electrical power requirement to another value equivalent to a second and lower cascade electrical power requirement comprising:

with the cascade in operation simulaneously directing into separate process-gas freezing zones substreams derived from one of said streams at different points along the length thereof to solidify in said zones substantially equal weights of process gas while reducing said signal inputs to maintain the positions of said control valves substantially unchanged despite the removal of process gas via said substreams.

* * * * *

UNITED STATES PATENT OFFICE
CERTIFICATE OF CORRECTION

Patent No. 4,040,801          Dated August 9, 1977

Inventor(s) Robert H. Dyer; Andrew H. Fowler and Paul R. Vanstrum

It is certified that error appears in the above-identified patent and that said Letters Patent are hereby corrected as shown below:

In the Abstract, line 14, "invention" should read --inventory--
Column 3, line 3, "state" should read --stage--
Column 7, line 55, "pulse-train" should read --pulse-rate--
Column 9, line 18, "A-line 10" should read --A-line 20--
Column 10, between lines 14 and 15, insert new line as follows:
    --2. Operator sets VAPORIZE position on master controller 14.--
Column 11, line 17, delete "device"
Column 12, line 20, "substreams;" should read --substreams.--
Column 12, line 26, delete "and subsequently"

Signed and Sealed this

Fourth Day of April 1978

[SEAL]

Attest:

RUTH C. MASON
Attesting Officer

LUTRELLE F. PARKER
Acting Commissioner of Patents and Trademarks